United States Patent [19]

Danel

[11] Patent Number: 4,646,587

[45] Date of Patent: Mar. 3, 1987

[54] HIGH-TORQUE HIGH-RATIO TRANSMISSION

[75] Inventor: François Danel, Grenoble, France

[73] Assignee: Assistance Industrielle Dauphinoise A.I.D., Meylan, France

[21] Appl. No.: 599,452

[22] Filed: Apr. 12, 1984

[30] Foreign Application Priority Data

Apr. 12, 1983 [FR] France ............... 83 06251

[51] Int. Cl.⁴ .............. F16H 33/00; F16H 35/00
[52] U.S. Cl. .............. 74/640; 74/800
[58] Field of Search .............. 74/640, 800

[56] References Cited

U.S. PATENT DOCUMENTS

| | | | |
|---|---|---|---|
| 2,849,897 | 9/1958 | Walma | 74/640 |
| 3,187,605 | 6/1965 | Stiff | 74/640 |
| 3,424,432 | 1/1969 | Humphreys | 74/640 X |
| 3,501,978 | 3/1970 | Ferrel | 74/640 |
| 3,525,890 | 8/1970 | Buchanan, Jr. | 74/640 X |
| 3,532,005 | 10/1970 | Bremner, Jr. et al. | 74/640 |

Primary Examiner—Leslie A. Braun
Assistant Examiner—Dirk Wright
Attorney, Agent, or Firm—Karl F. Ross; Herbert Dubno

[57] ABSTRACT

A high-torque high-ratio transmission comprises a housing provided with a rigid annular surface with teeth juxtaposed with the teeth of a flexible element connected to a slow shaft. The fast shaft has a flange provided with a groove of varying depth in which an array of balls is guided, the balls pressing the flexible element against the housing crown of teeth as the rapid shaft is rotated. The flange of the rapid shaft can be braced by another set of balls on the opposite side thereof.

3 Claims, 6 Drawing Figures

HIGH-TORQUE HIGH-RATIO TRANSMISSION

FIELD OF THE INVENTION

My present invention relates to a high-torque high-ratio transmission and, more particularly, to a transmission adapted to transmit high-force couples between a driving shaft and a driven shaft.

BACKGROUND OF THE INVENTION

For various reasons it may be necessary to change the speed of rotation of an output shaft or driven shaft vis-a-vis an input shaft or driving shaft and, especially, to provide speed reduction and torque multiplication between a driving shaft and a driven shaft or, conversely, to provide speed multiplication.

Numerous transmission systems have been provided for this purpose and those which are of interest here are high-performance transmissions or reducers, i.e. transmissions of the type which are useful in manipulating robots (mechanical arms or the like, for example, machining and delicate or high-load applications), indexing heads and dividing heads for use in numerical control technology, for use with special propulsion engines for monitoring or vehicles or controls in nuclear power plants or in conjunction with nuclear transmission cores, generally, for hoists or for other specific devices.

In all of these applications it is important that the speed reducer be of comparatively small size and low weight, have a high torque-transmitting capacity, be free from play and provide precise transmission of force with high-ratio reduction.

With existing reducers, these articles are for the most part mutually incompatible and attempts to eliminate play by improving fabrication tolerances and attempts to reduce size and weight by improvement of the alloys or materials used have not eliminated problems.

In the prior art system, a flexible bell having a toothed periphery is received in a rigid ring having internal toothing and is deformed against the ring by a device rotating within the bell. This device assures contact between the bell and the ring at two opposite points. With each rotation of this device, the bell is offset with respect to the surrounding ring by an angle equal to the distance between the number of teeth between the interengaging crowns of the bell and ring. While such a reducer is advantageous because it provides significant speed reduction in a single stage and is reversible so that it can also be used as a multiplier, it can be fabricated only at comparatively high cost, is bulky because it requires a bell of sufficient length that its deformation is effected with a suitable geometry for the contact between the teeth and is not free from play.

In another prior art device, a rigid crown is fixed to the transmission casing and is formed at one of its surfaces perpendicular to its axis with annular contact surfaces for engagement with a elastically deformed crown centered on the same axis and rotatably fixed to the slow shaft. This deformable crown has an annular contact surface for engagement with the surface of the first crown and a length greater than the length of the contact surface of the latter. The rapid shaft is provided with means ensuring contact at least one point between the rigid and flexible crowns. This means is in the form of a cage containing balls disposed diametrically opposite one another across the axis and which press the flexible crown at two diametrically opposite points against the rigid crown.

While the balls are effective to ensure the pressure of the flexible crown against the rigid crown and hence to generate an annular displacement in the flexible crown which is a fraction of the annular displacement of the rapid crown, this device does not admit of a well defined interengagement of the active surfaces, is not able to take up effectively the axial forces which are required and, in general, does not satisfy the requirements outlined above except for the requirement that a high ratio be provided.

OBJECTS OF THE INVENTION

It is, therefore, the principal object of the present invention to provide an improved transmission which can be utilized in all of the applications outlined previously without the drawbacks of the earlier systems described.

Another object of my invention is to provide an improved transmission, having a high ratio, small size, freedom from play and high-torque transmission capability which is of simple, light-weight construction and can be fabricated inexpensively.

Still another object of the invention is to provide a transmission which is especially suitable for use in manipulating arms at the articulations thereof and in other robotic locations.

SUMMARY OF THE INVENTION

These objects and others which will become apparent hereinafter are attained, in accordance with the invention, in a transmission which comprises a housing or casing surrounding an axis and provided on a fixed surface perpendicular to this axis with an annular crown of teeth, a slow shaft journaled in this housing and formed with a flexible element transverse to this axis and preferably in the form of a flexible disc or ring having a crown of teeth along its outer periphery which is juxtaposed with the rigid tooth crown but comprises a lesser number of teeth, a flange or member carried by the driving shaft or rapid shaft within this housing and provided with a groove opening toward the flexible element and preferably at the same radial distance from the axis as the crown of teeth thereof, and an array of balls riding in this groove, this groove having a variable distance from the rigid tooth crown or the aforementioned surface of the housing so that at least one undulation is provided which presses the balls against the rigid tooth crown to generate an angular displacement in the slow shaft as the rapid shaft is rotated.

Thus, as the rapid shaft is rotated, the undulation, or the undulations, are swept around the array of balls and relative to the elastic member so that the point at which the elastic element is pressed against the rigid crown similarly migrates and angular displacement of the slow shaft will be a function of the speed of the rapid shaft and the difference in the number of teeth.

Since the rigid crown forms part of or is on a fixed member, namely, the housing, the elastic element can be pressed against it at the undulation or undulations with any desired degree of free stress in the axial direction so that play is eliminated and the transmission of high torques can be ensured without detriment to the effective function of the device.

The device can be operated reversibly, i.e. as a speed multiplier if desired and the zones of contact between the elastic and flexible crowns can be formed by teeth.

The apparatus is simple to construct. The crowns are planar and are easily formed by casting or conventional machining without concern for fabrication tolerances and without difficulty in centering the various parts. The axial dimensions of the assembly can be limited and because the axial forces are taken up by the housing, the weight and size of the device can be minimal. The flange of the rapid shaft or any of the other discs used can also be provided with markers to cooperate with suitable detectors as coders and because of the general flow configuration, the unit can be utilized with great advantage in dividing plates or heads. The axial displacement of one or another of the crowns is all that is necessary to vary the play.

Advantageously, the contact surfaces between the two crowns are located along the peripheries thereof most distal from the axis, thereby ensuring high torque transmission.

While the device is suitable for use in a wide variety of applications, its compact structure has made it especially advantageous in the field of robotics for mounting in articulation of manipulating arms.

Advantageously, the balls disposed between the flexible crown and the flange or member entrained by the rapid shaft are uniformly distributed along the length of the groove and can be in contact with one another or separated by a cage. The uniform distribution of the forces along the row of the balls and around the platform of the flexible crown assist in rigidifying the assembly and eliminate parasitic deformations.

When a cage is used it is independent of the member entrained by the rapid shaft and can serve to prevent contact between adjustment balls which might disturb the relative movement. The undulations forming the base of the groove can be provided directly in the floor of the groove or by modification of the depth thereof or in a separate piece which can be mounted on a flange.

Alternatively, the flange may be a separate member affixed to the rapid shaft or firmly integrated with the shaft.

To reduce the weight of this flange the latter may be comparatively thin and can be supported by another row of balls with or without a cage received in a groove of the flange turned away from the flexible crown and braced against a ball of the housing. This reduces the inertia of the system and limits the axial forces which are transmitted to the bearings.

In another improvement of the invention, the slow shaft comprises a tubular member, i.e. as a hollow shaft within which the rapid shaft is journaled by appropriate bearings. This latter construction enables both the rapid and slow shafts to be mounted on the same side of the housing or enables the rapid shaft to be provided at least in part on the opposite side of the housing from the slow shaft.

BRIEF DESCRIPTION OF THE DRAWING

The above and other objects, features and advantages of the invention will become more readily apparent from the following description, reference being made to the accompanying drawing in which.

SPECIFIC DESCRIPTION

Figure 1:
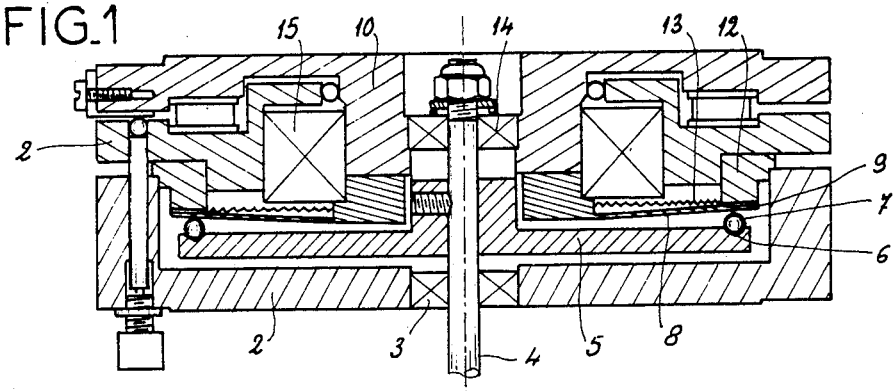
FIG. 1 is an axial cross sectional view through a first embodiment of a speed-changing transmission according to the invention.
Figure 2:
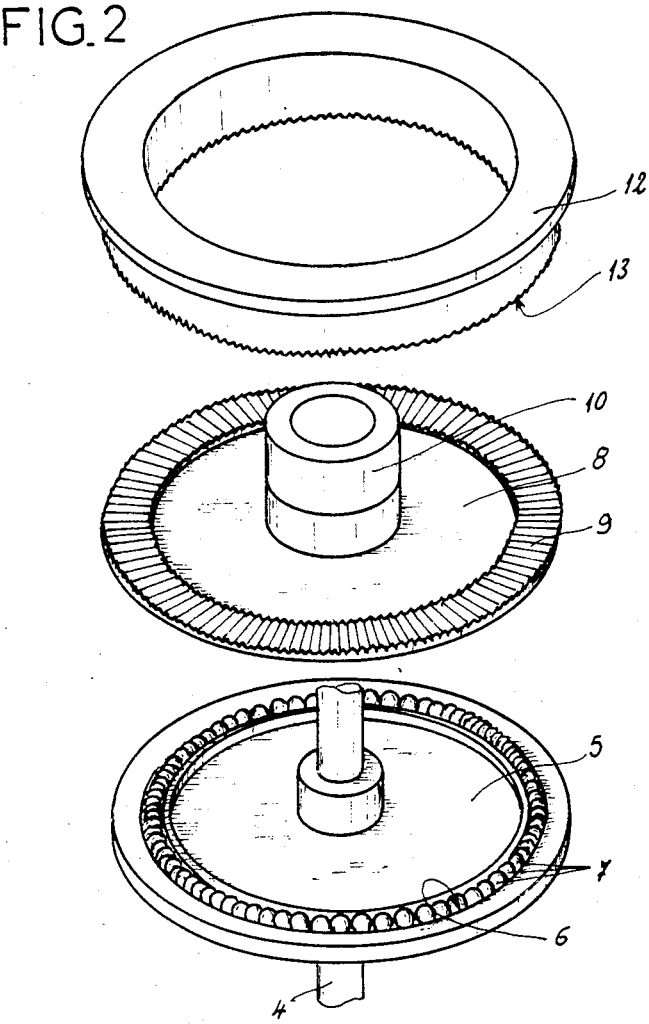
FIG. 2 is a perspective view in an exploded form illustrating the principal elements of this device.

The device shown in FIG. 1 comprises an annular body 2 consisting of a number of members forming the fixed element of the transmission. Within this body, journaled by bearings which have been represented at 3, I have provided a shaft 4 which will variously be described hereinafter as the drive shaft or the rapid shaft, i.e. the shaft which is intended to provide the input to the transmission when the latter is operated in a step-down mode. However, to the extent that the transmission is reversible, this shaft, while still the rapid shaft, will constitute an output shaft.

The shaft 4 is provided with a flange 5 in the form of a body of revolution and constitutes a rigid crown which is formed with a groove 6 opening axially upwardly in FIG. 1 and serving to guide balls 7 which may be closely juxtaposed with one another in the groove.

On the side of the flange 5 provided with the walls 7 there is disposed a disc 8 of a deflectable material, e.g. a spring metal, along the face of which turned away from the flange 5 a crown of teeth 9 is formed. The member 8 thus constitutes a flexible crown which can be resiliently deformed to follow the contour 16 of the groove 6 in a manner which will be described.

Disc 8 is coaxial with flange 5 and is fixed to the driven or slow shaft 10 which can represent the output shaft.

Juxtaposed with the flexible crown 8, 9, I provide a rigid crown 12 fixed to the body 2 which, as previously noted, is stationary. The crown 12 is provided with an annular array of teeth 13, the number of which is slightly less than the number of teeth of the flexible crown but whose teeth are shaped to engage the teeth of the flexible crown with a minimum of wear.

The slow or output shaft 10 is mounted between the rapid shaft 4 and the stationary body 2 with the interposition of bearings 14 and 15.

Figure 3:
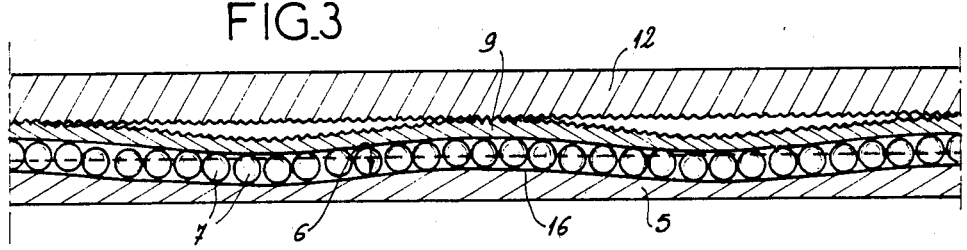
FIG. 3 is a longitudinal section in developed form illustrating the relationship between the member rigid with the rapid shaft and the flexible and rigid crowns.

As can be readily seen from the drawing, the base of the groove 6 is not at a constant distance from the rigid crown 12 but rather, as can be seen from FIG. 3, undulates to approach this crown and to be more distal therefrom around the groove. This is achieved by varying the depth of the groove in a preferred embodiment of the invention and the number of undulations over the length of the groove can be selected as may be desired.

In the preferred embodiment illustrated, the balls 7 are free to move and are disposed adjacent one another. However, they may also be separated by a cage, e.g. as shown at 17 in FIG. 4 as long as they are able to move in a coaxial direction to follow the undulations, the cage 17 being independent of the flange 5.

When the flange 5 is rotated by the rapid shaft 4, the undulations 16 press the balls 7 against the flexible crown 9 and the flexible crown 9 into engagement with the teeth of the rigid crown 12. The latter is rotated, therefore, at a ratio with respect to the speed of the drive shaft at a rate determined by the ratio of the deficiency of the teeth of the crown 12 to the teeth of the crown 9. In other words, for each revolution of the shaft 4, the shaft 10 will be rotated through an angle corresponding to the number of teeth by which the crown 12 is deficient as compared with the crown 9.

The contact between the rigid and flexible crowns is therefore affected only by the movement of the flange 5 and not by the movement of the balls 7, the rotation of which may be retarded with respect to the rotation of the flange 5 if the array of balls rotates at all. Indeed, it is not important whether these balls are entrained by the flange 5 at the speed thereof or move at some other speed or even do not rotate at all as a ring about the axis of the transmission.

While in the preferred mode of the invention, the undulations 16 are regular and uniform, they need not be and indeed their shape can be determined by whatever shape best suits the desired degree of contact between the teeth of the flexible crown 9 and the teeth of the rigid crown 12. For example, it is possible to maintain a predetermined amount of axial force at the contact zones and thereby prestress the zones to ensure complete elimination of play without interfering with the functioning of the transmission so that especially high torques can be transmitted.

Consequently, the transmission can have a high degree of elastic rigidity since at least at the contact points, the flexible crown is fixed between the balls and the rigid crown.

I have found it to be advantageous, moreover, to utilize the flange 5 as a coder, e.g. to generate trains of pulses which represent the speed of rotation of the shaft, utilizing any appropriate markings on this flange and any desired types of pick-ups, e.g. optical magnetic or electronic pick-ups.

It should also be apparent from the drawing that the device can readily be assembled and disassembled, maintains a separation between the rapidly moving and slower moving parts to permit any conventional lubrication techniques to be used, and is wholly compact.

Figure 4:
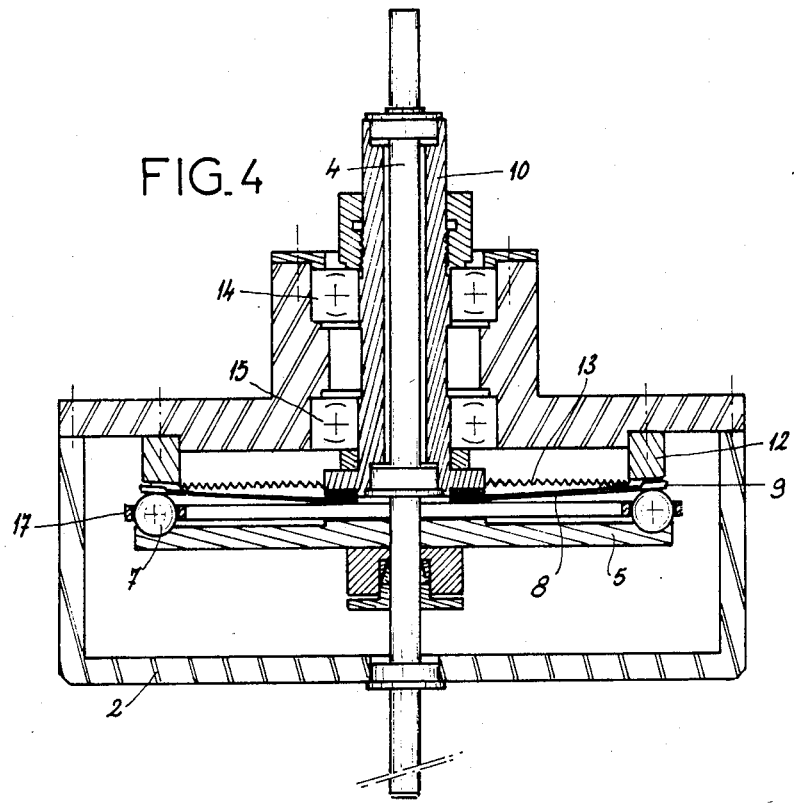
FIG. 4 is a longitudinal section through a modification of the embodiment of FIG. 1.

In FIG. 4, I have shown a modification of the device of FIG. 1 in which the same reference numerals are used to designate similarly functioning parts. In this case, however, the drive shaft 4 is coaxially surrounded by the output shaft 10 and extends through the latter by being journaled by respective bearings within the output shaft at opposite axial ends of the latter.

The rapid shaft and the slow shafts therefore can be located wholly at the same side of the device. In this case, the housing 2 has the configuration of a casing and the rigid crown 12 is mounted on one wall of this casing while the balls 7 on the flange 5, which is keyed to the shaft 4, are provided with the cage 17 previously mentioned.

Figure 5:
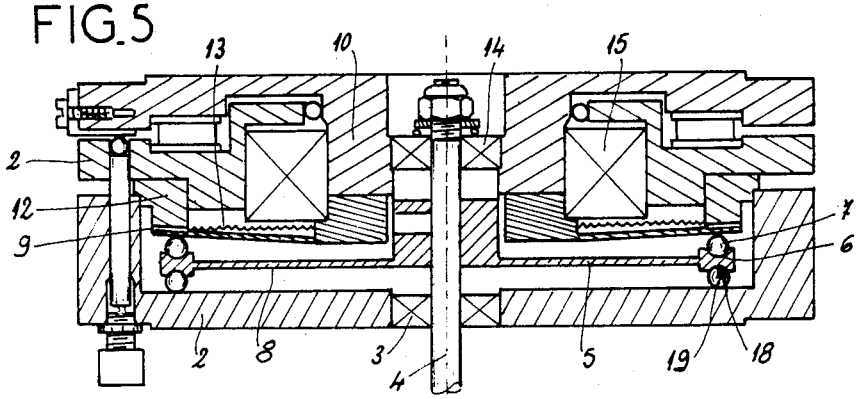
FIG. 5 is a longitudinal section through a modification of the embodiment of FIG. 1.

In FIG. 5, a modification of the system of FIG. 1 has been illustrated in which the flange 5 is provided with a further groove 18 in its face opposite that provided with groove 6. Only the groove 6 has the undulating configuration, however, and the groove 18 receives balls 19 which ride upon a ball of the housing 2 to stabilize the flange 5 in the axial direction. This system reduces inertia by altering the flange to be less massive and allows the housing to take up the forces with which the balls 7 press the flexible crown 9 against the rigid crown 12.

Figure 6:
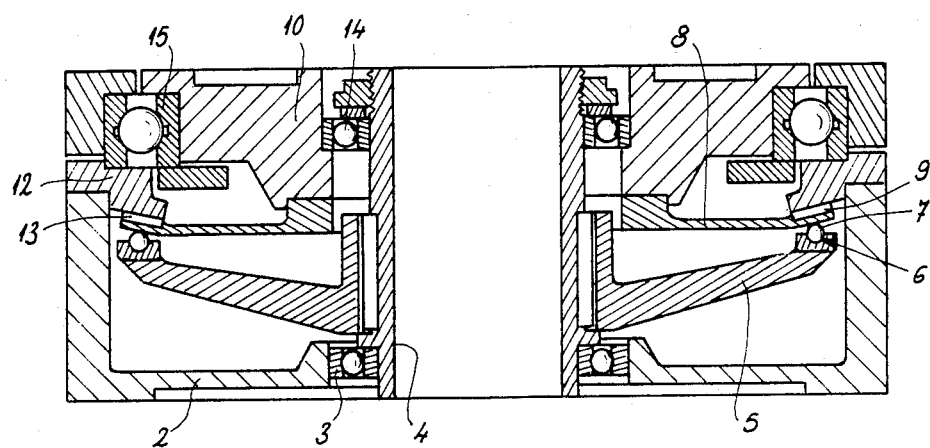
FIG. 6 is an axial section through still another embodiment. de

Finally, in FIG. 6 there is shown another transmission in which again similarly functioning parts are designated by the same reference numerals. In this device, the rapid shaft 4 is tubular and the flange 5 rigid therewith has a frustoconical configuration and is formed at its outer periphery with a tooth ring having the groove 6 in which the balls 7 can ride and which is provided with the undulations.

The slow shaft 10 is here a ring journaled by bearings 14 and 15, respectively, on the shaft 4 and the housing 2. The crown 12 reaches inwardly from the housing to be engaged by the crown 9 in the manner previously described.

As has been illustrated, this construction allows reinforcement of the elements subjected to axial forces so that such axial forces can be readily taken up without inducing binding. Because of the conical shape of the flange 5, the latter has considerable rigidity even though it is of light weight and hence light inertia. Indeed, this flange can be composed of a light metal or other light weight material as long as the race provided with the groove 6 is composed of a harder material, e.g. a hard-faced steel.

Consequently, the transmission of the invention provides a compact unit for the reversible transmission of high torques at significant speed ratios between driving and driven shafts and a transmission which is reversible does not require readjustment and reciting of tolerances at frequent intervals and which consists of parts which are readily duplicated and easily replaced. Play can be avoided without difficulty and thus illustrated, the entire assembly can be sealed to eliminate environmental effects and ensure pertinent application. Axial forces can be readily absorbed by stationary elements so that binding is simplified. Because high force couples can be transmitted, the device is especially effective for use in robotics and can be sufficiently compact to enable its incorporation directly into the articulations of robotic arms with mechanical or electrical combinations and indeed, also enables integration of the device with a coder in the manner already indicated. Modification of the device within the scope of the invention can also be made, e.g. to form the flange unitarily with the rapid shaft 4, to provide unitarily or with a separate piece forming the undulations to vary the shape and number of undulations and to vary the number and disposition of the balls.

I claim:

1. A high-torque, high-ratio transmission comprising:
  a housing surrounding an axis;
  a rapid shaft extending along said axis into said housing and journaled for rotation relative to said housing about said axis;
  an annular member connected to said shaft;
  a hollow slow shaft journaled in said housing along said axis, said housing being provided with a rigid annular surface transverse to said axis and axially juxtaposed with, but spaced from, said member, said rigid annular surface having a circular array of teeth lying in a plane perpendicular to said axis and projecting axially in the direction of said member;
  bearings journaling said rapid shaft in said slow shaft;
  an elastically deformable annular element in the form of a flexible planar disk fixed to said slow shaft, disposed between said rigid annular surface and said member, and juxtaposed with said rigid surface, said eleastically deformable annular element having an annular axially deflectable surface provided with a circular array of axially projecting teeth engageable with the teeth of said rigid annular surface, said array of teeth of said rigid annular surface having a circumferential length less than a circumferential length of said array of teeth of said annular axially deflectable surface, the number of teeth of said array of teeth on said rigid surface being less than the number of teeth of said array of teeth on said annular axially deflectable surface, said annular member being formed with an axially open circular groove opening in the direction of said element and juxtaposed therewith, said groove lying in a plane perpendicular to said axis and having a depth variable along the circumference of said groove; and a circular ball array formed by a multiplicity of balls displaceable annularly independently of said member and received in said groove whereby the variation in depth of said groove axially displaces balls of said circular ball array against said element to deflect said element against said rigid surface and for each rotation of said rapid shaft, at least one undulation is generated in said circular ball array and said array of teeth of elastically deformable annular element to advance said slow shaft through a dispance determined by the difference in said lengths.

2. The transmission defined in claim 1 wherein said member is a flange connected to said rapid shaft and extending outwardly therefrom, said flange being formed on one face with said groove at an outer periphery of said flange and being formed on an opposite face turned away from said disk with a further groove juxtaposed with a portion of said housing, said transmission further comprising another array of balls in said further groove bearing against said portion of said housing.

3. The transmission defined in claim 1, further comprising a cage spacing said balls of said circular ball array around said groove with equal spaces.

* * * * *